Dec. 27, 1927. 1,653,835
A. BENAGLIA
DEVICE FOR THE PRODUCTION OF ANY PATTERNS WITH GROOVES AND PROJECTING
PORTIONS ON THE SURFACE OF RUBBER TIRES DURING THE TIRE REGENERATION
Filed March 25, 1926

Inventor.
Agide Benaglia

Patented Dec. 27, 1927.

1,653,835

UNITED STATES PATENT OFFICE.

AGIDE BENAGLIA, OF BOLOGNA, ITALY.

DEVICE FOR THE PRODUCTION OF ANY PATTERNS WITH GROOVES AND PROJECTING PORTIONS ON THE SURFACE OF RUBBER TIRES DURING THE TIRE REGENERATION.

Application filed March 25, 1926, Serial No. 97,374, and in Italy April 10, 1925.

The present invention relates to a device for the production of any desired patterns with sunk and projecting parts on the surface of rubber tires while the tire is being regenerated.

According to the invention, on the bottom of the inner space (having the shape of a circle segment) of an ordinary kettle for the regeneration of rubber tires according to the Austrian Patent No. 101,384 a plate bent to suit the curvature of the kettle bottom is arranged. Along the middle line of this plate a groove is formed in the inner face of this plate and in this groove a flexible band is placed. This band encircles the whole periphery of the tire to be regenerated and to the band face coming in contact with the tire small blocks are fitted, these blocks being designed to produce the sunk portions in the tire pattern. One end of the said band is made up of hinged elements adapted to be readily taken out and put in, in order to suit the band length to the varying lengths of the tire periphery.

The invention is illustrated by way of example in one of its execution forms by the accompanying drawing, in which.

Figure 1:
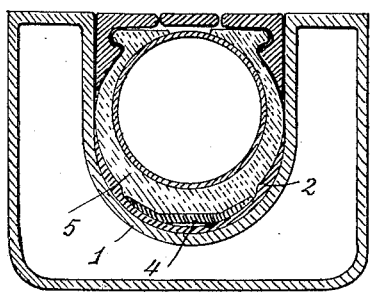
Fig. 1 is a cross section showing a regenerating kettle of the above said type with the device according to the invention applied thereto.
Figure 2:
Fig. 2 shows one member of the device.

On the bottom of the inner space of the kettle or mold 1 a bent plate 2 is lodged, in the inner face in which a longitudinal groove 3 is formed, this groove being symmetrical relatively to the vertical center plane of the tire.

In the groove 3 a flexible band 4 is lodged, this band embracing the tire periphery and being secured thereto. On the inner periphery of the band 4 small projecting blocks 6 are secured which, during the tire regenerating operation, serve to produce on the tire periphery the sunk portions of the pattern to be imprinted on the tire.

The blocks 6 may have a different form from that shown on the drawing.

Figure 3:
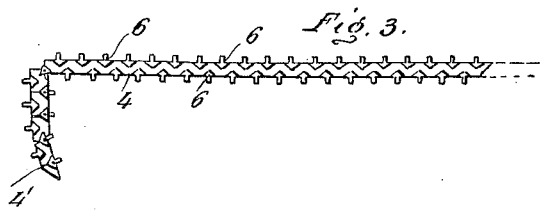
Fig. 3 shows the other member of the device.

At one of its ends the flexible band is made up of hinged members 4' (Fig. 3) the purpose of which is to suit the band length to the varying lengths of the periphery of the tires. When tires of a smaller diameter are regenerated, these members are taken out and the two band ends connected together in any convenient manner.

When, on the contrary, tires of a larger diameter are to be regenerated, as many of these elements are put in as may be required—in order to completely encircle the tire periphery.

Of course the constructive and form details may be varied within the spirit and scope of the invention from those shown and described.

Having now particularly described and ascertained the nature of my said invention and in what manner the same is to be performed, I declare that what I claim is:—

1. Device for the production of patterns with sunk and projecting portions on the outer surface of rubber tires during the tire regenerating operation, characterized by the fact that in the inner chamber having in section the form of a circle segment of an ordinary kettle for rubber tire regeneration a bent plate is lodged suiting the shape of the said chamber, a groove being formed along the longitudinal center line of said plate for accommodation of a flexible band encircling only the tire periphery and having secured to its inner face a set of small blocks suited to produce the sunk portions of the pattern that must be imprinted in relief on tread surface of the tire; one end of the flexible band being made up of hinged members that can be readily taken out and put in again in order to permit of suiting the band length to the varying lengths of the periphery of the tires to be regenerated.

2. A device for the production of patterns with projecting and depressed portions on the outer surface of rubber tires during the tire regenerating operation comprising a mold; a plate adapted to be inserted into the mold and having a groove therein; and a flexible band adapted to be inserted into the groove and comprising the pattern to be produced as the tread portion of the tire, said band having a plurality of hinged members at one end which can be removed from and added to the band to vary its length to accommodate any periphery of a tire to be regenerated.

Signed at Milan (Italy), this 9th day of March, 1926.

AGIDE BENAGLIA.